United States Patent Office 3,383,165
Patented May 14, 1968

3,383,165
PROCESS FOR PRODUCING NON-CAKING BORAX
George W. Campbell, Jr., Tustin, Calif., assignor to United States Borax & Chemical Corporation, Los Angeles, Calif., a corporation of Nevada
No Drawing. Filed Oct. 6, 1964, Ser. No. 401,992
10 Claims. (Cl. 23—59)

ABSTRACT OF THE DISCLOSURE

A process for producing a highly comminuted borax which is essentially anhydrous but having about 0.4–1% water content in the surface portion of the individual borax granules so that caking is decreased.

---

This invention relates to a method for producing anhydrous borax which resists caking. More particularly, the invention relates to a method of steam treating anhydrous borax whereby a non-caking product is obtained which remains free-flowing over an extended period of time. Additionally, this invention relates to the non-caking anhydrous borax product obtained from said process.

As noted in the U.S. patent to L. C. Schmitt No. 3,109,705, borax ($Na_2B_4O_7 \cdot 10H_2O$) is known to cake during storage. The reason given for such caking is that there is dehydration and subsequent evaporation of the water of hydration thereby resulting in an interlocking of adjacent crystals.

Various methods have been suggested for the production of non-caking borax. In general, the known methods have been unsuccessful or have produced a product which does not have a desired purity.

Accordingly, it is the object of the present invention to provide a method for producing a non-caking borax. It is an additional object to provide a method for producing non-caking anhydrous borax which is free from undesirable impurities. Further, it is an object to provide an improved anhydrous borax product which is resistant to caking and which remains free-flowing for extended periods of time.

In accordance with the method of this invention anhydrous borax is steam treated to produce a product which is substantially non-caking. More particularly, comminuted anhydrous borax having less than approximately 5–6% —200 mesh fines when steam treated to a surface water content of 0.4–1%, and preferably to a surface water content of 0.6–1%, by weight, is a material which cakes less and much slower than prior known products. Steaming of anhydrous borax containing about 2% —200 mesh fines to 0.6% surface water content will reduce the caking rate by 80–90% and will reduce the degree of caking by 70–80%; and, in every case, will give a product which cakes less and much slower than prior anhydrous borax products. To achieve the same results with anhydrous borax containing 5–6% —200 mesh fines requires about 1% surface hydration. It is to be understood that the 0.4–1% water is the total amount of water taken up by the anhydrous borax particles and further, that this water is concentrated on the surface of the particles due to hydration thereof. If the anhydrous borax must be screened to proper screen analysis, the steaming operation should be conducted as soon as possible thereafter so as to insure the production of a uniform, non-caking product.

The above noted invention can be utilized with any apparatus which will afford the desired surface water concentration. Steam is the preferred treating agent; however, any gas, inert to the anhydrous borax, yet having sufficient water content—in the vaporous state—to properly hydrate the surface of the anhydrous borax particles, is applicable, and accordingly, is considered as being within the scope of the invention. Flue gas or cold, moist air, having water vapor entrained therein, are additional examples of applicable treating agents. The invention can be used with bag or bulk shipment and its use in bag shipment will not require any change in the type of bag commonly utilized. Additionally, it is not necessary to change other handling procedures. The product was tested to determine if the steam treated borax would cake in storage and it was found that caking occurred only if stored under pressure at 130° F. Such a temperature would normally not occur in a plant, and, accordingly, caking would not be encountered.

In the following examples, reference is made to a test for determining the relative amount of caking in any given sample. This relative test for such a determination is called the shear caking test and is conducted as follows:

(1) 8 oz. cosmetic jars having a 3″ inside diameter were modified by cementing retaining rings, of $3/16''$ thickness, to the interior wall at a point approximately ⅔ of the distance from the bottom of the jar to the top. This ring prevented the entire cake of material from being pulled from the jar during testing of the shearing strength of the cake.

(2) Plastic jar caps with attached hooks or rings were utilized as shearing disks. When the extent of caking was to be measured, the disks were connected to one of two spring balances (chatillon, 0–32 oz. and 0–160 oz.) and pulled out of the cake.

(3) Samples were placed in the jars and hydrated in a constant temperature-constant humidity cabinet which provided a constant, reproducible environment. Such an environment, as would be expected, made it possible to determine and compare hydration rates of any of the samples tested.

(4) After hydration to a desired percentage of water, the disks were pulled out of the cake with the spring balance.

(5) The average force, in ounces, required to pull out the disks was used as a measure of the caking of the sample tested.

Additionally, in the following examples, all anhydrous borax samples were fresh product (United States Borax & Chemical Corp., anhydrous borax, AB-12) which was adjusted, when necessary, to the desired particle size distributions. The normal variability in caking tendency of such a product, at 0.6% water absorption, is on the order of 31–54 oz. by the Shear Caking Test, noted above.

Example I

This example illustrates the hydration and caking of anhydrous borax under normal industrial conditions. Both samples were typical production samples but were collected on different dates.

|  | Sample 1 | Sample 2 |
|---|---|---|
| Time, hours | 9 | 19 |
| $H_2O$, Percent | 0.22 | 0.21 |
| Caking,[a] oz | 27 | 25 |
| Time, hours | 44 | 45 |
| $H_2O$, percent | 0.61 | 0.58 |
| Caking,[a] oz | 49 | 57 |

[a] Shear Caking Test as noted above.

Example 2

This example illustrates the effect of steaming on caking and the hydration rate of anhydrous borax.

| Sample No | 1 | 1a | 2 | 2a | 3 | 3a | 4 | 4a |
|---|---|---|---|---|---|---|---|---|
| Screen Analysis, Percent: | | | | | | | | |
| +20 | 24.0 | 24.0 | 20.3 | 20.3 | 20.8 | 20.8 | 28.2 | 28.2 |
| −20, +40 | 30.1 | 30.1 | 28.0 | 28.0 | 29.0 | 29.0 | 37.1 | 37.1 |
| −40, +70 | 21.6 | 21.6 | 24.1 | 24.1 | 25.0 | 25.0 | 23.6 | 23.6 |
| −70, +100 | 9.1 | 9.1 | 10.8 | 10.8 | 11.1 | 11.1 | 6.0 | 6.0 |
| −100, +140 | 4.9 | 4.9 | 6.6 | 6.6 | 6.8 | 6.8 | 1.9 | 1.9 |
| −140, +200 | 4.1 | 4.1 | 5.3 | 5.3 | 5.5 | 5.5 | 1.3 | 1.3 |
| −200 | 6.3 | 6.3 | 5.0 | 5.0 | 2.1 | 2.1 | 1.9 | 1.9 |
| Steam, Percent | | 0.6 | | 1.0 | | 0.5 | | 0.6 |

These samples were subsequently hydrated by placing filled jars in a controlled humidity-controlled temperature cabin at 100° F. and 35% relative humidity. When the samples reached ambient temperature, the relative humidity was increased to 70% to cause hydration.

CAKING AFTER HYDRATION WITH 0.2% ADDITIONAL WATER

| | 1 | 1a | 2 | 2a | 3 | 3a | 4 | 4a |
|---|---|---|---|---|---|---|---|---|
| Caking,[a] oz | 27 | 31 | 26 | 5 | 20 | 8 | 27 | 7 |
| Hydration Time, Hours | 5.5 | 8 | 4 | 20 | 6 | 60 | 9 | 11.5 |
| Average caking rate, oz./hr | 4.9 | 3.9 | 6.5 | 0.25 | 3.3 | 0.12 | 3.0 | 0.6 |
| Reduction of Av. caking rate, percent | | 20 | | 95 | | 95 | | 80 |
| Reduction of caking Percent | | 20 | | 70 | | 65 | | 60 |

CAKING AFTER HYDRATION WITH 0.6% ADDITIONAL WATER

| | 1 | 1a | 2 | 2a | 3 | 3a | 4 | 4a |
|---|---|---|---|---|---|---|---|---|
| Caking,[a] oz | 96 | 64 | 56 | 18 | 40 | 14 | 49 | 20 |
| Hydration Time, Hours | 84 | 79 | 108 | 160 | 100 | | 44 | 70 |
| Average caking rate, oz./hr | 1.1 | 0.8 | 0.5 | 0.1 | 0.4 | | 1.1 | 0.3 |
| Reduction of Av. caking rate, Percent | | 25 | | 80 | | | | 70 |
| Reduction of caking, Percent | | 33 | | 65 | | 65 | | 70 |

[a] Shear caking Test as noted above.

The steaming operation produced a material which, after further hydration as would be experienced under normal operating conditons, was non-caking and free-flowing over an extended period of time. The caking rate was substantially reduced thereby permitting the production of a superior anhydrous borax material having non-caking properties heretofore unobtainable.

It will be understood that many modifications are possible in the operations that have been described herein without departing from the true spirit and scope of the invention.

What is claimed is:

1. The process for producing a non-caking anhydrous borax comprising hydrating comminuted anhydrous borax having less than approximately 6% −200 mesh fines to a surface water content of approximately 0.4–1% by contacting with a water vapor containing gas which is inert to said comminuted anhydrous borax.

2. The process for producing a non-caking anhydrous borax comprising hydrating comminuted anhydrous borax having approximately 2% −200 mesh fines by contacting with a water vapor containing gas which is inert to said comminuted anhydrous borax until said comminuted anhydrous borax particles have a surface water content of approximately 0.6%.

3. The process for producing a non-caking anhydrous borax comprising hydrating comminuted anhydrous borax having approximately 5–6% −200 mesh fines by contacting with a water vapor containing gas which is inert to said comminuted anhydrous borax until said comminuted anhydrous borax particles have a surface water content of approximately 1%.

4. The process for producing a non-caking anhydrous borax comprising screening anhydrous borax particles to obtain a particles mixture having less than approximately 6% −200 mesh fines, treating said anhydrous borax particle mixture with a water vapor containing gas which is inert to said anhydrous borax until said anhydrous borax particles have a surface water content of approximately 0.4–1%, and thereafter recovering the non-caking anhydrous borax.

5. The process for producing a non-caking anhydrous borax comprising screening anhydrous borax particles to obtain a particle mixture having approximately 2% −200 mesh fines, treating said anhydrous borax mixture with a water vapor containing gas which is inert to said anhydrous borax until said anhydrous borax particles have a surface water content of approximately 0.6%, and thereafter recovering the non-caking anhydrous borax.

6. The process for producing a non-caking anhydrous borax comprising screening anhydrous borax particles to obtain a particle mixture having approximately 5–6% −200 mesh fines, treating said anhydrous borax mixture with a water vapor containing gas which is inert to said anhydrous borax until said anhydrous borax particles have a surface water content of approximately 1%, and thereafter recovering the non-caking anhydrous borax.

7. The process for producing a non-caking anhydrous borax comprising treating comminuted anhydrous borax having less than approximately 6% −200 mesh fines with steam until said anhydrous borax particles have a surface water content of approximately 0.4–1%.

8. The process for producing a non-caking anhydrous borax comprising treating comminuted anhydrous borax having approximately 2% −200 mesh fines with steam until said anhydrous borax particles have a surface water content of approximately 0.6%.

9. The process for producing a non-caking anhydrous borax comprising treating comminuted anhydrous borax having approximately 5 to 6% −200 mesh fines with steam until said anhydrous borax particles have a surface water content of approximately 1%.

10. The process for producing a non-caking anhydrous borax comprising screening anhydrous borax particles to obtain a particle mixture having less than approximately 6% −200 mesh fines, treating said anhydrous borax particle mixture with steam until said anhydrous borax particles have a surface water content of approximately 0.4–1%, and thereafter recovering the non-caking anhydrous borax.

References Cited

UNITED STATES PATENTS

| | | | |
|---|---|---|---|
| 2,064,337 | 12/1936 | Black | 23—59 |
| 3,309,170 | 3/1967 | Griswold | 23—59 |
| 1,685,214 | 9/1928 | Cramer | 23—59 |

FOREIGN PATENTS

| | | |
|---|---|---|
| 768,308 | 11/1957 | Great Britain. |
| 117,372 | 7/1958 | Russia. |

OTHER REFERENCES

Carter: "Ceramic Industry," vol. 32, No. 2, February 1939, pp. 53–54.

OSCAR R. VERTIZ, *Primary Examiner*.

MILTON WEISSMAN, HERBERT T. CARTER, *Examiners*.